United States Patent
Woo

(10) Patent No.: US 8,403,190 B2
(45) Date of Patent: Mar. 26, 2013

(54) TRAY ASSEMBLY FOR VEHICLE

(75) Inventor: Jung Hoon Woo, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 486 days.

(21) Appl. No.: 12/797,233

(22) Filed: Jun. 9, 2010

(65) Prior Publication Data

US 2011/0133506 A1 Jun. 9, 2011

(30) Foreign Application Priority Data

Dec. 4, 2009 (KR) .................. 10-2009-0120163

(51) Int. Cl.
*B60R 7/06* (2006.01)

(52) U.S. Cl. ..... 224/281; 224/483; 224/929; 296/37.12; 312/311

(58) Field of Classification Search .......... 224/281–282, 224/483, 929; 312/127, 130, 270.3, 271, 312/273, 281, 310–311, 334.8; 296/37.12
See application file for complete search history.

(56) References Cited

U.S. PATENT DOCUMENTS

| | | | | |
|---|---|---|---|---|
| 1,471,899 A * | 10/1923 | Koenig | ............................ | 232/17 |
| 2,275,060 A * | 3/1942 | Griffin | ...................... | 312/334.27 |
| 2,518,985 A * | 8/1950 | Geyh | ............................. | 312/273 |
| 2,814,544 A * | 11/1957 | Cornish | ........................ | 312/271 |
| 2,814,545 A * | 11/1957 | Cornish | ........................ | 312/271 |
| 3,227,505 A * | 1/1966 | Ambaum | ....................... | 312/311 |
| 3,883,205 A * | 5/1975 | Ambaum et al. | ........... | 312/330.1 |
| 4,657,214 A * | 4/1987 | Foster | ......................... | 248/176.1 |
| 4,720,131 A * | 1/1988 | Grote | ............................. | 296/37.9 |
| 5,197,775 A * | 3/1993 | Reeber | ........................ | 296/37.12 |
| 5,460,309 A * | 10/1995 | Nehl et al. | ..................... | 224/281 |
| 7,004,380 B2 * | 2/2006 | Gunvaldson | .................... | 232/29 |
| 7,494,172 B2 * | 2/2009 | Herterich et al. | ............. | 296/37.8 |
| 7,708,328 B2 * | 5/2010 | Doom et al. | ................. | 296/37.12 |
| 8,127,962 B2 * | 3/2012 | Kogami | ........................ | 220/348 |
| 2005/0275235 A1 | 12/2005 | Park | | |

FOREIGN PATENT DOCUMENTS

| | | |
|---|---|---|
| FR | 2945493 A1 * | 11/2010 |
| JP | 5-338502 A | 12/1993 |
| JP | 9-272379 A | 10/1997 |
| JP | 2606579 Y2 | 9/2000 |
| JP | 2008279839 A * | 11/2008 |
| KR | 10-2008-0028000 A | 3/2003 |
| KR | 20-0382515 Y1 | 4/2005 |
| KR | 10-2005-0117908 A | 12/2005 |
| KR | 10-2007-0060436 A | 6/2007 |

* cited by examiner

*Primary Examiner* — Nathan J Newhouse
*Assistant Examiner* — John Cogill
(74) *Attorney, Agent, or Firm* — Morgan, Lewis & Bockius LLP

(57) ABSTRACT

Disclosed is a tray assembly. The tray assembly may include a tray having a guide slot, a hinge arm including a cam-shaped portion and rotably coupled to the tray, a cover fixed to an end portion of the hinge arm, a drawer box storable in the tray and having a guide pin at a side portion thereof, the guide pin passing through the guide slot of the tray and being movable along the guide slot by selectively engaging with the cam-shaped portion of the hinge arm.

8 Claims, 6 Drawing Sheets

TRAY ASSEMBLY FOR VEHICLE

CROSS-REFERENCE TO RELATED APPLICATION

The present application claims priority to Korean Patent Application Number 10-2009-0120163, filed on 4 Dec. 2009, the entire contents of which is incorporated herein for all purposes by this reference.

BACKGROUND OF THE INVENTION

1. Field of the Invention

The present invention relates to a tray assembly for a vehicle, and more particularly, to a tray assembly which is able to allow an electronic appliance tray to cooperate with a general drawer tray, wherein the electronic appliance tray is a tray for a mobile phone, an MP3 player or the like, in a vehicle.

2. Description of Prior Art

Generally, a vehicle has a case-shaped tray which stores various appliances such as a mobile phone or the like. For this tray, a cover is provided to open and close the tray. The conventional tray has a mechanism using a guide pin and a slot so as to open and close the cover.

FIG. 1 is a perspective view for illustrating a state that a conventional tray assembly is closed, and FIG. 2 is a perspective view for illustrating a state that the tray assembly of FIG. 1 is opened.

Referring to FIGS. 1 and 2, a roller 10 is equipped to a guide pin 22 of a holding tray 20, and a hinge arm 40 is rotably equipped to a drawer tray 30. The drawer tray 30 is fixed to a vehicle, and the holding tray 20 is formed to be movable relative to the drawer tray 30.

The hinge arm 40 has a shape of a semi-circle, and a slot 42 with a shape of a circular arc is formed on the hinge arm 40. The guide pin 22 of the holding tray 20 is interposed in the slot 42 so that the roller 10 may be contact with a side of the circular arc-shaped slot 42 of the hinge arm 40.

The guide pin 22 of the holding tray 20 is formed rotably along the slot 42 between the first position and the second position of the circular arc-shaped slot 42. Concretely, when the guide pin 22 is placed at the first position of the slot 42, a cover 50 which is fixed to hinge arm 40 maintains a closed state, and when the guide pin 22 is placed at the second position of the slot 42, the cover 50 maintains an open state.

According to the conventional tray assembly, when the guide pin 22 is guided in the slot 42, the guide pin 22 may be smoothly guided in a forward or rearward direction due to the rolling of the roller 10.

On the other hand, the fact is that the number of the trays has increased according as the number of the electronic appliances equipped in the vehicle has increased. But, since each of the trays according to the conventional art has a structure to be open and close the tray individually, the tray occupies much space in the vehicle, and accordingly, the prime cost and the weight of the vehicle may increase.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a tray assembly, in which an electronic appliance tray and a main tray in the vehicle are able to cooperating with each other by one mechanism.

In an aspect of the present invention, the tray assembly may include a tray having a guide slot, a hinge arm including a cam-shaped portion and rotably coupled to the tray, a cover fixed to an end portion of the hinge arm, a drawer box storable in the tray and having a guide pin at a side portion thereof, the guide pin passing through the guide slot of the tray and being movable along the guide slot by selectively engaging with the cam-shaped portion of the hinge arm, wherein, when the guide pin is placed at a first position of the guide slot, the guide pin is slidable along the guide slot without interference with the hinge arm while the cover maintains opened, such that the drawer box fixed to the guide pin is movable into the tray, and when the guide pin is placed at the first position or between the first position and a second position of the guide slot, the guide pin is slidable along the guide slot by the cam-shaped portion of the hinge arm when the hinge arm is rotated, such that the drawer box fixed to the guide pin is movable into the tray and the cover closes the tray.

The hinge arm may have a linear portion and the cam-shaped portion and, when the guide pin is placed at the first position of the guide slot and the cover maintains opened, the guide pin is movable along the guide slot under the linear portion of the hinge arm without interference with the hinge arm.

The tray may include a first tray and a second tray formed under the first tray, and wherein the hinge arm is rotably coupled to the first tray and the second tray stores the drawer box therein.

The first tray may be a holding box, and the second tray may be a tray for an electronic appliance.

The hinge arm may be rotably coupled to the first tray by a pin and a circle plate, the pin fixing the circular plate to the first tray, and wherein the hinge arm is rotatably engaged with the circle plate.

The guide slot of the second tray may be formed in a linear type.

The guide slot of the tray may be formed in a linear type.

The cover may be monolithically integrated with the hinge arm.

According to the tray assembly of the present invention, because an electronic appliance tray and a main tray in the vehicle are able to cooperating with each other by one mechanism, it is possible to economize the space in the vehicle and reduce the weight of the vehicle.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

Figure 1:
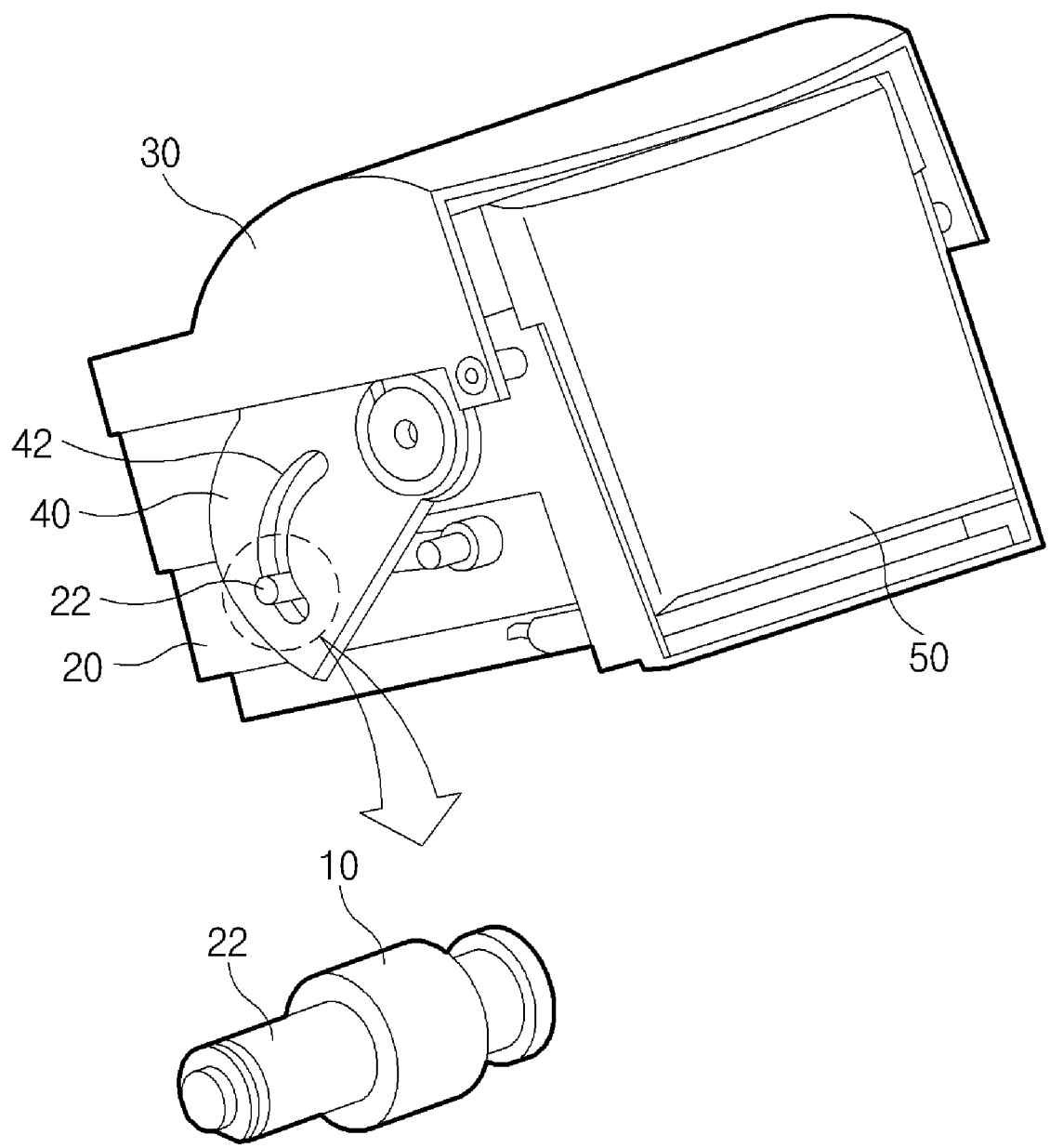
FIG. 1 is a perspective view for illustrating a state that a conventional tray assembly is closed.
Figure 2:
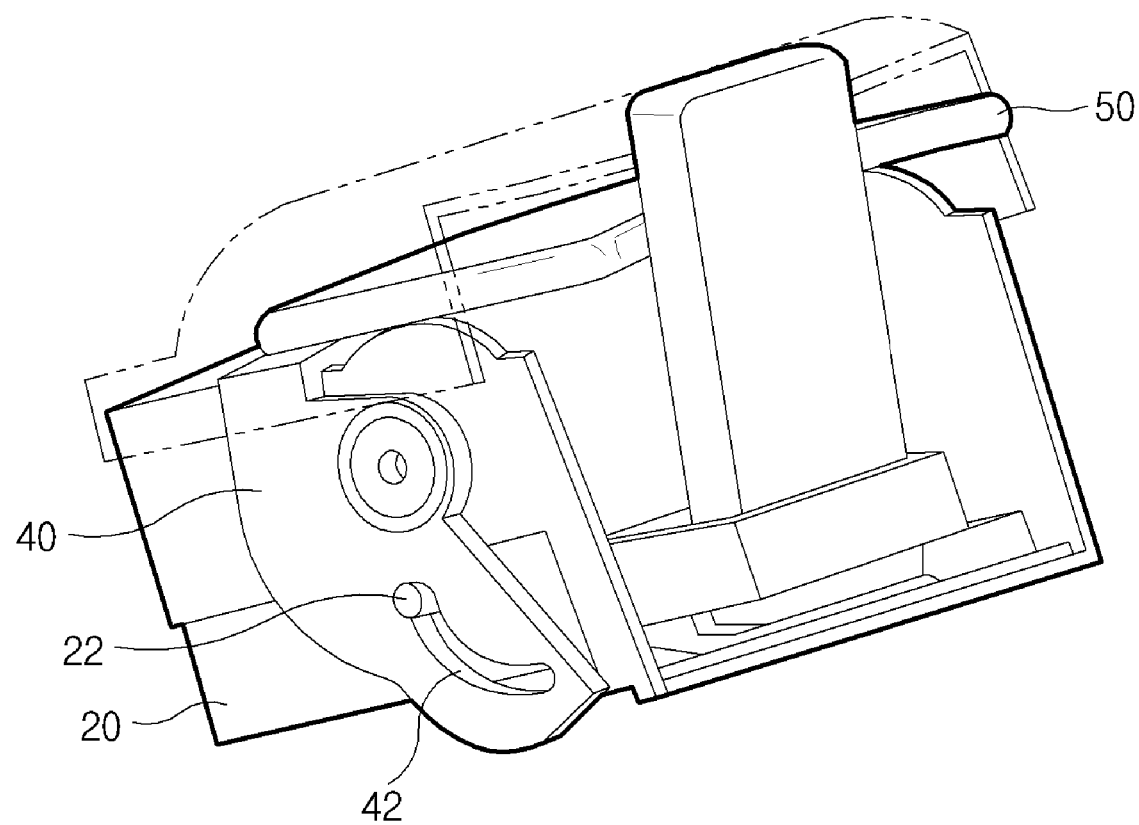
FIG. 2 is a perspective view for illustrating a state that the tray assembly of FIG. 1 is opened.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Now, a tray assembly according to an exemplary embodiment of the present invention which is cooperating with an electronic appliance tray will be explained in detail on the basis of the attaching drawings.

Figure 3:
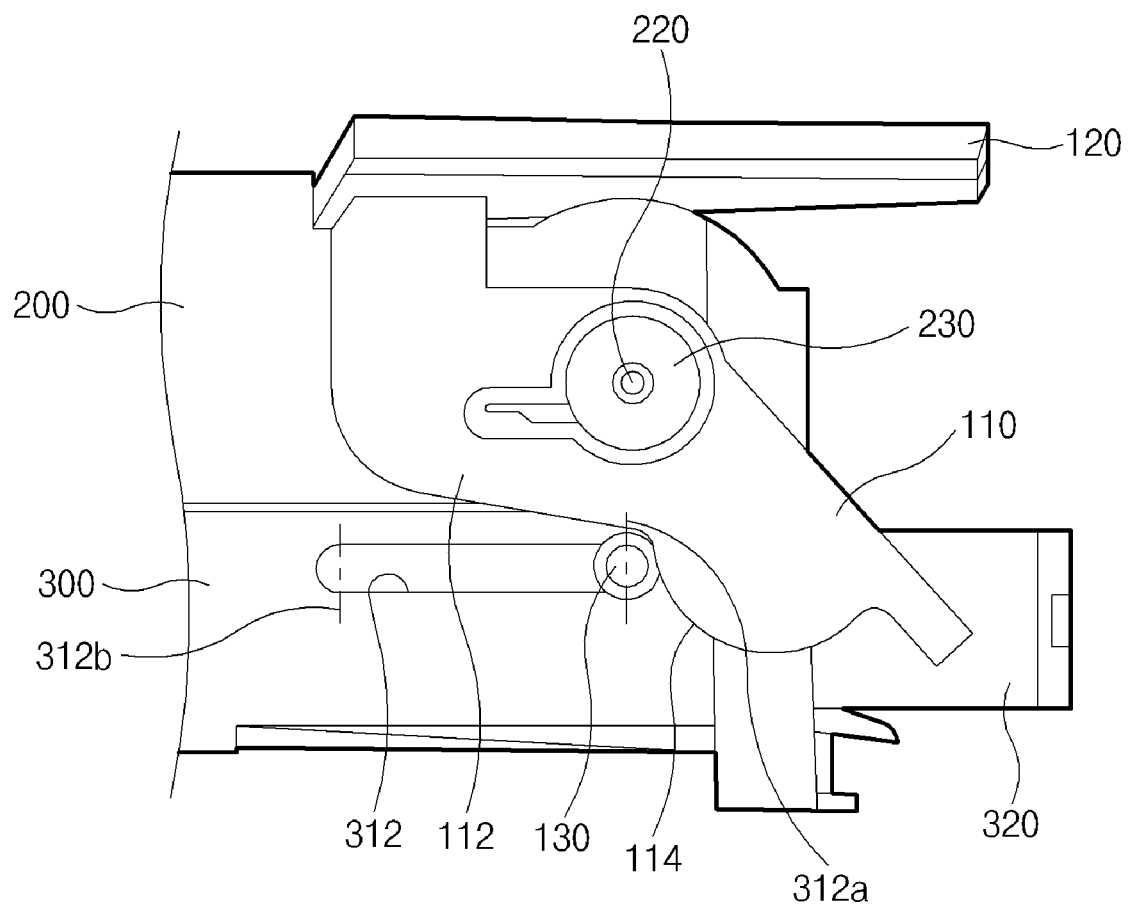
FIG. 3 is a side view for showing a state that an exemplary tray assembly of an electronic appliance according to the present invention is cooperating with a tray assembly, when a guide pin is paced at the first position of a slot.
Figure 4:
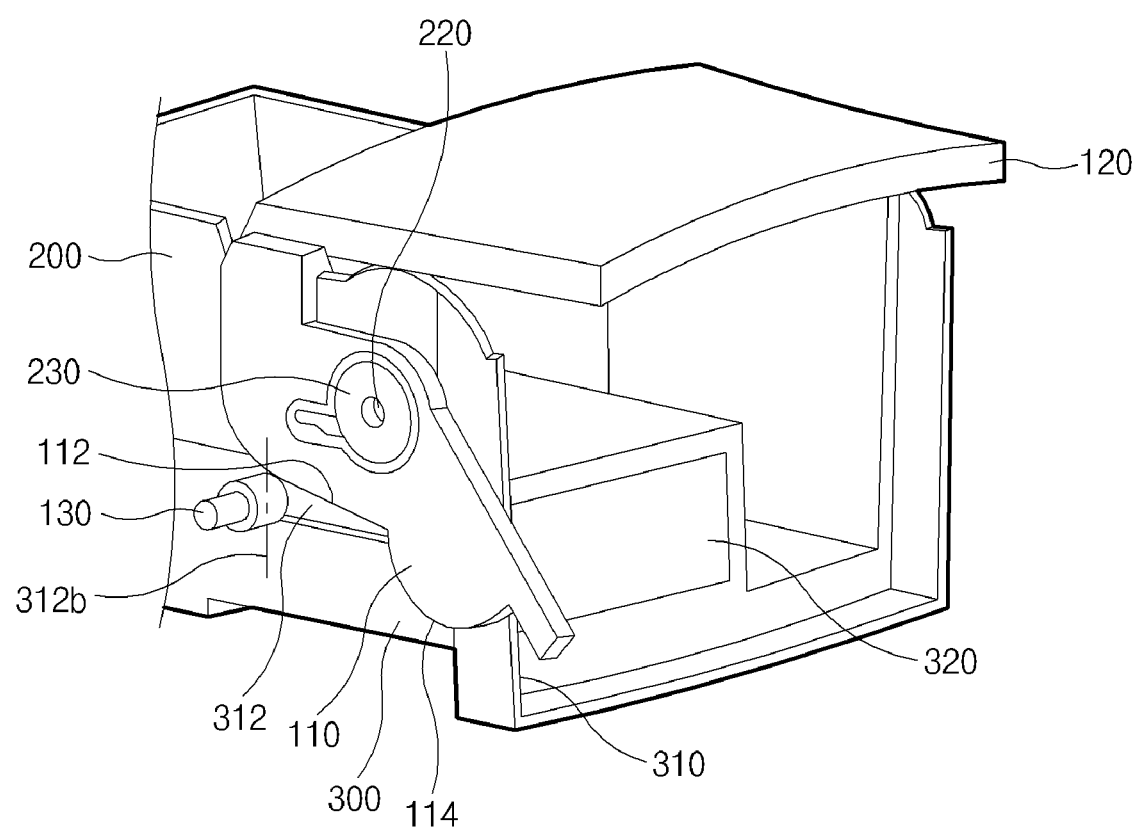
FIG. 4 is a perspective view for showing the exemplary tray assembly of FIG. 3 when the guide pin is paced at the second position of a slot.
Figure 5:
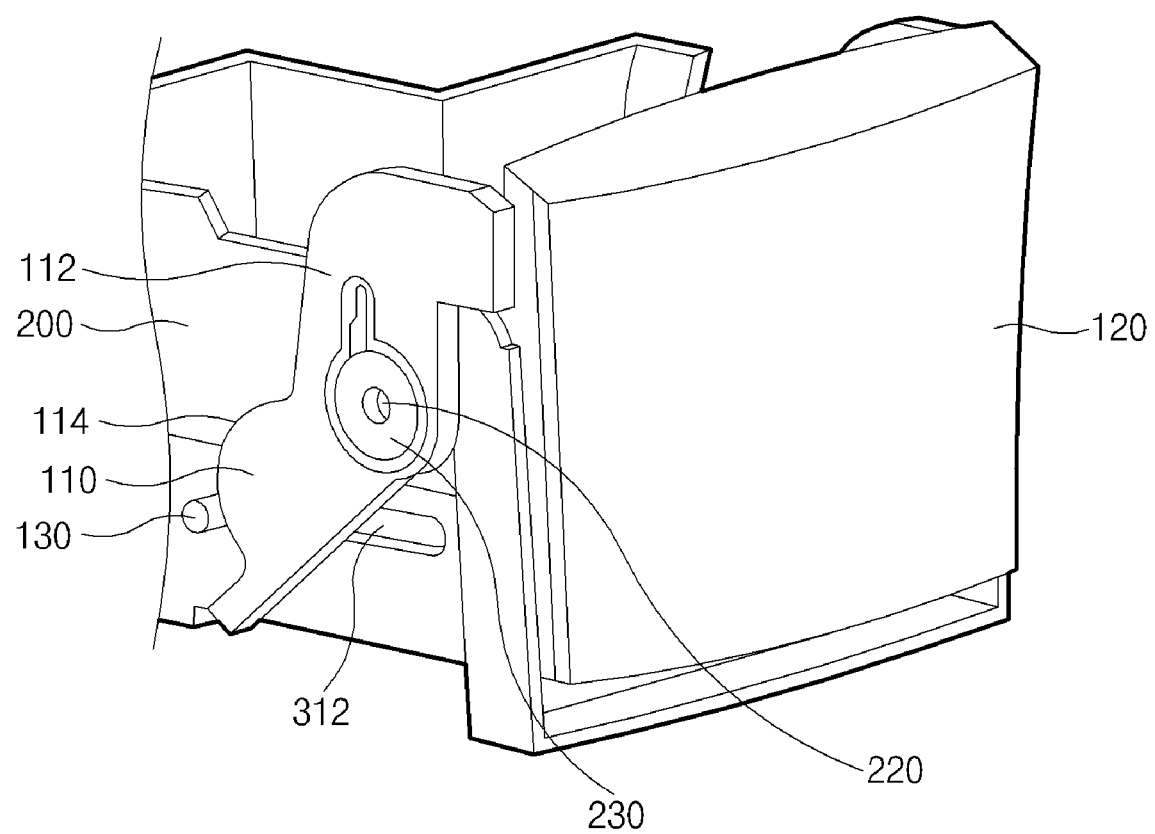
FIG. 5 is a perspective view for showing the exemplary tray assembly of FIG. 3 when the guide pin is paced at the third position of a hinge arm.
Figure 6:
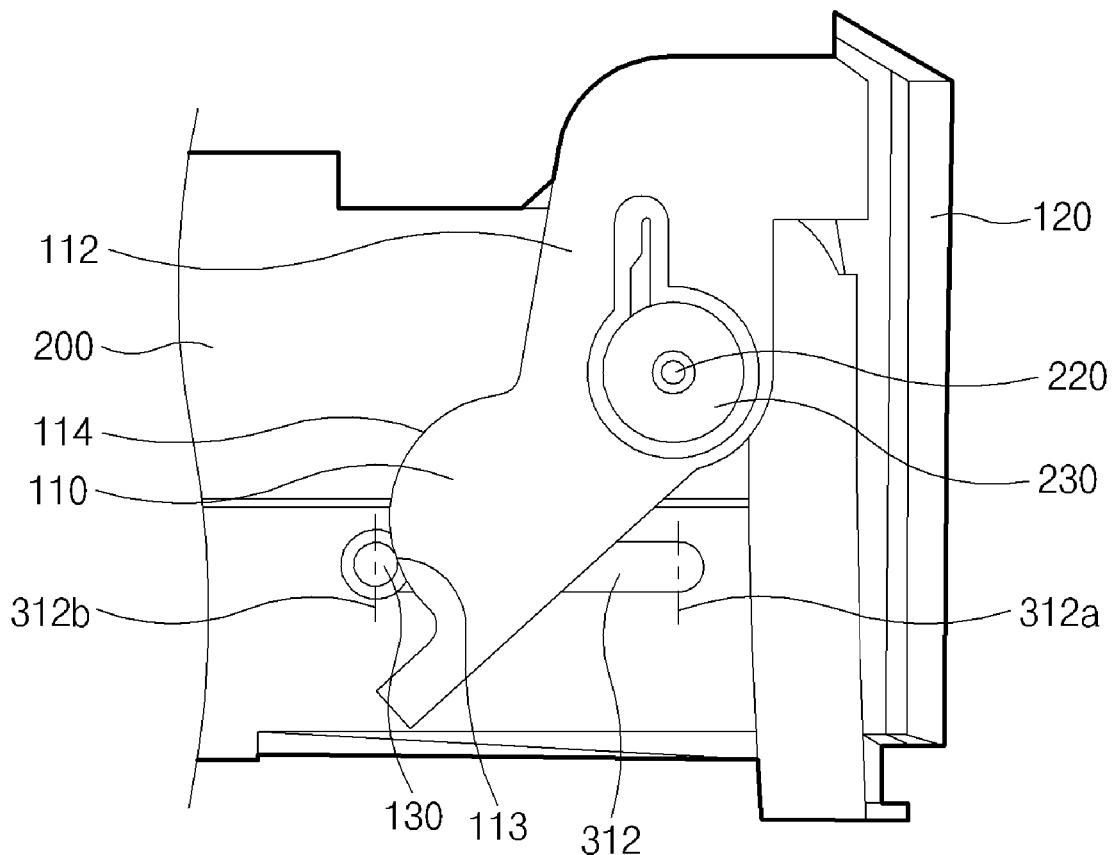
FIG. 6 is a side view for showing the exemplary tray assembly of FIG. 3 when the guide pin is paced at the third position of the hinge arm.

FIG. 3 is a side view for showing a state that a tray of an electronic appliance according to an exemplary embodiment of the present invention is cooperating with a tray assembly, when a guide pin is paced at the first position of a slot, FIG. 4 is a perspective view for showing the tray assembly of FIG. 3 when the guide pin is paced at the second position of a slot, and FIGS. 5 and 6 are a perspective view and a side view for showing the tray assembly of FIG. 3 when the guide pin is paced at a cam-shaped portion of a hinge arm as explained later in detail.

Referring to FIGS. 3 to 6, a tray assembly according to the exemplary embodiment of the present invention includes a drawer tray 200, a hinge arm 110 which is rotably equipped to the drawer tray 200, a cover 120 for the drawer tray which is fixed to an edge of the hinge arm 110, an electronic appliance tray 300 which includes a housing 310 and a drawer box 320 which is storable in the housing 310, and a guide pin 130 fixed to a side portion of the drawer box 320 of the electronic appliance tray 300, the guide pin 130 being inserted into a guide slot 312 formed in the housing 310 of the electronic appliance tray 300 and being movable along the guide slot 312.

In the exemplary embodiment of the present invention, the guide slot 312 which is formed in the housing 310 of the electronic appliance tray 300 is formed in a linear type. Also, the cover 120 for the drawer tray is integrated with the hinge arm 110.

The hinge arm 110 is rotably equipped in the drawer tray 200 by means of a pin 220 and a circle plate 230, in which the pin 220 is rotably inserted into a hole (not shown) formed in the drawer tray 200, and the circle plate 230 is fixed to the pin 220.

A side of the hinge arm 110 has a shape of a cam. Due to the cam-shaped side of the hinge arm 110, when the guide pin 130 is placed at the first position 312a of the guide slot 312, the cover 120 for the drawer tray and the drawer box 320 of the electronic appliance tray 300 maintain an open state, respectively as shown in FIG. 3.

Besides, after this, when the user pushes the drawer box 320 into the housing 310 of the electronic appliance tray 300, the guide pin 130 is moved at the second position 312b of the guide slot 312 and thus the cover 120 for the drawer tray 200 maintains the open state, and the drawer box 320 of the electronic appliance tray 300 is closed as shown in FIG. 4.

In addition, when the guide pin 130 maintains to be placed at the first position 312a of the guide slot 312 or between the first and second positions 312a and 312b and the hinge arm 110 is rotated, the cover 120 closes the drawer tray 200 and the drawer box 320 altogether.

The cam-shaped side of the hinge arm 110 has a linear portion 112 so that the cover 120 for the drawer tray may maintain the open state while the drawer box 320 of the electronic appliance tray 300 may be closed, during the guide pin 130 is moving from the first position 312a to the second position 312b of the guide slot 312.

Also, the cam-shaped side of the hinge arm 110 has a semi-circle portion 114 so that the cover 120 fixed to the hinge arm 312 may close the drawer box 320 when the guide pin 130 placed at the first position 312a of the guide slot 312 or between the first and second positions 312a and 312b moves to the second position 312b while the guide pin 130 is pushed by the cam-shaped portion 113 of the hinge arm 110 in a rearward direction by rotating the hinge arm 110.

Referring to the attaching drawings, the operation of the tray assembly according to the exemplary embodiment of the present invention will be explained as follows.

To begin with, in the exemplary embodiment of the present invention, the guide slot 312 formed in the housing 310 of the electronic appliance tray 300 is formed in a linear type. Besides, as mentioned above, a portion of the hinge arm 110 is formed in a shape of a cam.

The cam-shaped side of the hinge arm 110 has a linear portion 112 so that the cover 120 for the drawer tray may maintain the open state while the drawer box 320 of the electronic appliance tray 300 may be closed, during the guide pin 130 is moving from the first position 312a to the second position 312b of the guide slot 312.

Also, the cam-shaped side of the hinge arm 110 has a semi-circle portion 114 so that when the cover 120 for the drawer tray is closed and thus the hinge arm 110 is rotated, the guide pin 130 placed at the first position 312a of the guide slot 312 moves to the second position 312b of the guide slot 312 and thus the drawer box 320 moves into the housing 310 of the electronic appliance tray 300.

Because of the linear portion 112 of the hinge arm 110, when the guide pin 130 is placed at the first position 312a of the guide slot 312, the cover 120 for the drawer tray maintains the open state and the drawer box 320 of the electronic appliance tray 300 is movable into the housing 310 of the electronic appliance tray 300. For instance, while the guide pin 130 is moved to be placed at the second position 312b of the guide slot 312 by pushing back the drawer box 320, the cover 120 for the drawer tray maintains the open state and the drawer box 320 of the electronic appliance tray 300 is closed.

In addition, while the guide pin 130 is disposed at the first position guide slot 312a or between the first and second positions 312a and 312b, the rotation of the hinge arm 110 moves the guide pin 130 to the second position 312b of the guide slot 312 by cam-shaped portion 113 of the hinge arm 110 and thereby the cover 120 of the drawer tray and the drawer box 320 are closed altogether.

For convenience in explanation and accurate definition in the appended claims, the terms "lower", "forward" and "rearward" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A tray assembly comprising:
a tray having a guide slot;
a hinge arm including a cam-shaped portion and rotably coupled to the tray;
a cover fixed to an end portion of the hinge arm;
a drawer box storable in the tray and having a guide pin at a side portion thereof, the guide pin passing through the guide slot of the tray and being movable along the guide slot by selectively engaging with the cam-shaped portion of the hinge arm,
wherein, when the guide pin is placed at a first position of the guide slot, the guide pin is slidable along the guide slot without interference with the hinge arm while the cover is maintained open, such that the drawer box fixed to the guide pin is movable into the tray; and
when the guide pin is placed at the first position or between the first position and a second position of the guide slot, the guide pin is slidable along the guide slot by the cam-shaped portion of the hinge arm when the hinge arm is rotated, such that the drawer box fixed to the guide pin is movable into the tray and the cover closes the tray.

2. The tray assembly of claim 1, wherein the hinge arm has a linear portion and the cam-shaped portion and, when the guide pin is placed at the first position of the guide slot and the cover maintains opened, the guide pin is movable along the guide slot under the linear portion of the hinge arm without interference with the hinge arm.

3. The tray assembly of claim 1, wherein the tray comprises a first tray and a second tray formed under the first tray, and wherein the hinge arm is rotably coupled to the first tray and the second tray stores the drawer box therein.

4. The tray assembly of claim 3, wherein the first tray is a holding box, and the second tray is a tray for an electronic appliance.

5. The tray assembly of claim 3, wherein the hinge arm is rotably coupled to the first tray by a pin and a circle plate, the pin fixing the circular plate to the first tray, and wherein the hinge arm is rotatably engaged with the circle plate.

6. The tray assembly of claim 3, wherein the second tray includes a guide slot formed in a linear type.

7. The tray assembly of claim 1, wherein the guide slot of the tray is formed in a linear type.

8. The tray assembly of claim 1, wherein the cover is monolithically integrated with the hinge arm.

* * * * *